US012706386B2

(12) United States Patent
Liu et al.

(10) Patent No.: US 12,706,386 B2
(45) Date of Patent: Aug. 11, 2026

(54) PATCH ANTENNA, OMNIDIRECTIONAL ANTENNA ARRAY AND COPLANAR RADIATING ANTENNA ARRAY INCLUDING THE SAME

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Bingyang Liu, Beijing (CN); Jia Fang, Beijing (CN); Yiqun Hu, Beijing (CN); Ying Ding, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 18/996,700

(22) PCT Filed: May 14, 2024

(86) PCT No.: PCT/CN2024/093079
§ 371 (c)(1),
(2) Date: Jan. 17, 2025

(87) PCT Pub. No.: WO2024/260153
PCT Pub. Date: Dec. 26, 2024

(65) Prior Publication Data

US 2026/0039020 A1 Feb. 5, 2026

(30) Foreign Application Priority Data

Jun. 21, 2023 (CN) ........................ 202310745904.6

(51) Int. Cl.
*H01Q 9/04* (2006.01)
*H01Q 21/06* (2006.01)
*H01Q 21/20* (2006.01)

(52) U.S. Cl.
CPC ........... *H01Q 9/0414* (2013.01); *H01Q 9/045* (2013.01); *H01Q 21/065* (2013.01); *H01Q 21/205* (2013.01)

(58) Field of Classification Search
CPC ........ H01Q 9/0414; H01Q 9/045; H01Q 1/38; H01Q 1/50; H01Q 21/065
See application file for complete search history.

(56) References Cited

FOREIGN PATENT DOCUMENTS

| | | | |
|---|---|---|---|
| CN | 2836258 | Y | 11/2006 |
| CN | 101267065 | A | 9/2008 |

(Continued)

OTHER PUBLICATIONS

International Search Report corresponding to PCT Application No. PCT/CN2024/093079 (Aug. 28, 2024).

*Primary Examiner* — Daniel Munoz
(74) *Attorney, Agent, or Firm* — Myers Bigel, P.A.

(57) ABSTRACT

The present disclosure provides a patch antenna including stacked first and second insulating medium substrates, and a radiating patch is provided on the second insulating medium substrate. The patch antenna further includes a plurality of strip-shaped metal structures, each passing through the first and second insulating medium substrates, a first end thereof being electrically connected with the metal layer and a second end thereof being attached to a metal sheet. At least two strip-shaped metal structures are located at a first side of the radiating patch, and at least two strip-shaped metal structures are located at an opposite second side. Metal sheets attached to two strip-shaped metal structures that are farthest apart from each other and located at a same side are (Continued)

bent toward each other. Furthermore, the present disclosure also relates to an omnidirectional antenna array and a coplanar radiating antenna array including the patch antenna.

20 Claims, 12 Drawing Sheets

(56) References Cited

FOREIGN PATENT DOCUMENTS

| | | | | | |
|---|---|---|---|---|---|
| CN | 102655274 | A | | 9/2012 | |
| CN | 104241842 | A | | 12/2014 | |
| CN | 204760534 | U | | 11/2015 | |
| CN | 208142345 | U | | 11/2018 | |
| CN | 111370870 | A | | 7/2020 | |
| CN | 212515009 | U | | 2/2021 | |
| CN | 114784495 | A | | 7/2022 | |
| CN | 115911869 | A | | 4/2023 | |
| CN | 114374085 | B | * | 7/2023 | ............... H01Q 1/48 |
| CN | 116995436 | A | * | 11/2023 | ............. H01Q 9/045 |
| CN | 117895215 | A | * | 4/2024 | ............... H01Q 1/48 |
| WO | 03098738 | A2 | | 11/2003 | |
| WO | 2019213878 | A1 | | 11/2019 | |
| WO | 2021249045 | A1 | | 12/2021 | |

* cited by examiner

PATCH ANTENNA, OMNIDIRECTIONAL ANTENNA ARRAY AND COPLANAR RADIATING ANTENNA ARRAY INCLUDING THE SAME

RELATED APPLICATIONS

The present application is a 35 U.S.C. 371 national stage application of PCT International Application No. PCT/CN2024/093079 filed on May 14, 2024, which claims the benefits of Chinese Patent Application No. 202310745904.6, the entire disclosures of which are incorporated herein by reference.

TECHNICAL FIELD

The present disclosure relates to the field of communication technology. In particular, the present disclosure relates to a patch antenna, and also to an omnidirectional antenna array and a coplanar radiating antenna array including the patch antenna.

BACKGROUND

With the development of communication technology, the technology of Internet of Things has made great progress, and the interconnection of all things has become a major trend in development. The basis for realizing interconnection in the Internet of Things is high-throughput, low-latency network coverage based on antennas, and therefore, an omnidirectional antenna array is needed to achieve basic network coverage. In the related art, the beam width of patch antennas is generally small, resulting in the need for more patch antennas (typically six patch antennas) when forming an omnidirectional antenna array. Furthermore, it is also taught in the related art to increase the beam width by bending the radiating patch itself, but this approach on the one hand increases the profile of the antenna to a certain extent, thereby impacting subsequent applications, and on the other hand increases the complexity of the structure of the patch antenna, which in turn results in a harder manufacturing process and higher costs.

SUMMARY

According to a first aspect of the present disclosure, there is provided a patch antenna including: a first insulating medium substrate including a first surface and an opposite second surface, a metal layer being provided on the first surface of the first insulating medium substrate; a second insulating medium substrate including a first surface and an opposite second surface, a first radiating patch being provided on the first surface of the second insulating medium substrate, wherein the first insulating medium substrate and the second insulating medium substrate are stacked such that the second surface of the first insulating medium substrate abuts against the first surface of the second insulating medium substrate; and a plurality of strip-shaped metal structures located at both sides of the first radiating patch, each strip-shaped metal structure passing through the first insulating medium substrate and the second insulating medium substrate, a first end of each strip-shaped metal structure being electrically connected to the metal layer and a second end of each strip-shaped metal structure being attached to a metal sheet, the plurality of strip-shaped metal structures being arranged to surround the first radiating patch and be spaced apart from the first radiating patch, wherein at least two strip-shaped metal structures are located at a first side of the first radiating patch, and at least two strip-shaped metal structures are located at a second side of the first radiating patch, which is opposite to the first side, metal sheets attached to two strip-shaped metal structures that are farthest apart from each other among the at least two strip-shaped metal structures at the first side are bent toward each other, metal sheets attached to two strip-shaped metal structures that are farthest apart from each other among the at least two strip-shaped metal structures at the second side are bent toward each other as well, and a bent metal sheet forms an angle greater than or equal to 0 degrees and less than 90 degrees with the second surface of the second insulating medium substrate.

According to some exemplary embodiments, each strip-shaped metal structure is formed by a first via passing through the first insulating medium substrate and a second via passing through the second insulating medium substrate, the first via and the second via are aligned with each other, and hole walls of the first via and the second via are covered with a metal layer.

According to some exemplary embodiments, the plurality of strip-shaped metal structures include four strip-shaped metal structures, wherein two strip-shaped metal structures are located at the first side of the first radiating patch, and the other two strip-shaped metal structures are located at the second side, and a quadrangle formed by sequentially connecting first ends of the strip-shaped metal structures surrounds an orthographic projection of the first radiating patch onto the first surface of the first insulating medium substrate.

According to some exemplary embodiments, an orthographic projection of the patch antenna onto the first insulating medium substrate has a rectangular shape, and the four strip-shaped metal structures are respectively located at four corners of the patch antenna.

According to some exemplary embodiments, metal sheets attached to two strip-shaped metal structures located at a same side of the first radiating patch are bent toward each other.

According to some exemplary embodiments, the second end of the strip-shaped metal structure is flush with the second surface of the second insulating medium substrate, and the metal sheet is a metal trace printed onto the second surface of the second insulating medium substrate.

According to some exemplary embodiments, metal traces of two strip-shaped metal structures located at a same side of the first radiating patch are arranged as: deflecting, on the second surface of the second insulating medium substrate, towards the first radiating patch or away from the first radiating patch relative to a connecting line between second ends of the two strip-shaped metal structures, wherein a deflecting angle of the deflection ranges from greater than 0 degrees to less than or equal to 10 degrees.

According to some exemplary embodiments, the patch antenna further includes a second radiating patch provided on the second surface of the second insulating medium substrate, an orthographic projection of the second radiating patch onto the first surface of the second insulating medium substrate is at least partially overlapped with the first radiating patch.

According to some exemplary embodiments, the patch antenna further includes at least one intermediate insulating medium substrate provided between the first insulating medium substrate and the second insulating medium substrate, at least one intermediate radiating patch is provided on the intermediate insulating medium substrate, and an orthographic projection of the intermediate radiating patch onto the first surface of the second insulating medium substrate is at least partially overlapped with the first radiating patch.

According to some exemplary embodiments, the patch antenna further includes a feeding line provided on the first surface of the second insulating medium substrate, the feeding line is electrically connected with the first radiating patch.

According to some exemplary embodiments, the patch antenna further includes a coaxial cable line, the coaxial cable line passes through the first insulating medium substrate, and an outer conductor of the coaxial cable line is electrically connected with the metal layer on the first surface of the first insulating medium substrate, an inner conductor of the coaxial cable line is electrically connected with the first radiating patch.

According to some exemplary embodiments, the metal layer includes a slit, an orthographic projection of the slit onto the first surface of the second insulating medium substrate falls within the first radiating patch; the patch antenna further includes a wiring substrate including a first surface and an opposite second surface, the second surface of the wiring substrate abuts against the first surface of the first insulating medium substrate, a feeding line is provided on the first surface of the wiring substrate, and the feeding line is electrically connected with the metal layer.

According to some exemplary embodiments, a shape of the slit includes an H-shape.

According to some exemplary embodiments, a polygon formed by sequentially connecting first ends of the strip-shaped metal structures surrounds an orthographic projection of the first radiating patch onto the first surface of the first insulating medium substrate.

According to some exemplary embodiments, a distance from a center of a first end of each strip-shaped metal structure to a center of an orthographic projection of the first radiating patch onto the first surface of the first insulating medium substrate is between ⅕ to ⅓ of an operating wavelength of the patch antenna.

According to a second aspect of the present disclosure, there is provided an omnidirectional antenna array, including at least three patch antennas according to the first aspect of the present disclosure and various exemplary embodiments thereof, wherein the at least three patch antennas are arranged such that axis lines each passing through a center of a patch antenna and extending along a normal direction of the first insulating medium substrate and the second insulating medium substrate intersect at a point.

According to some exemplary embodiments, the at least three patch antennas are arranged to contact each other.

According to some exemplary embodiments, the at least three patch antennas include three patch antennas, and an angle between adjacent two of the axis lines of the three patch antennas is 120 degrees.

According to some exemplary embodiments, a distance between centers of two adjacent patch antennas is less than ¼ of an operating wavelength of the patch antennas.

According to a third aspect of the present disclosure, there is provided a coplanar radiating antenna array including: a first insulating medium substrate including a first surface and an opposite second surface; a second insulating medium substrate including a first surface and an opposite second surface, wherein the first insulating medium substrate and the second insulating medium substrate are stacked such that the second surface of the first insulating medium substrate abuts against the first surface of the second insulating medium substrate; and a plurality of patch antenna modules. Each patch antenna module includes: a metal layer provided on the first surface of the first insulating medium substrate; a first radiating patch provided on the first surface of the second insulating medium substrate; and a plurality of strip-shaped metal structures located at both sides of the first radiating patch, each strip-shaped metal structure passing through the first insulating medium substrate and the second insulating medium substrate, a first end of each strip-shaped metal structure being electrically connected with the metal layer and a second end thereof being attached to a metal sheet, the plurality of strip-shaped metal structures being arranged to surround the first radiating patch and be spaced apart from the first radiating patch, wherein at least two strip-shaped metal structures are located at a first side of the first radiating patch, and at least two strip-shaped metal structures are located at a second side of the first radiating patch, which is opposite to the first side, metal sheets attached to two strip-shaped metal structures that are farthest apart from each other among the at least two strip-shaped metal structures at the first side are bent toward each other, metal sheets attached to two strip-shaped metal structures that are farthest apart from each other among the at least two strip-shaped metal structures at the second side are bent toward each other as well, and a bent metal sheet forms an angle greater than or equal to 0 degrees and less than 90 degrees with the second surface of the second insulating medium substrate.

According to some exemplary embodiments, the plurality of patch antenna modules includes a low-frequency patch antenna module and a high-frequency patch antenna module.

According to some exemplary embodiments, in at least one patch antenna module of the plurality of patch antenna modules, each strip-shaped metal structure is formed by a first via passing through the first insulating medium substrate and a second via passing through the second insulating medium substrate, the first via and the second via are aligned with each other, and hole walls of the first via and the second via are covered with a metal layer.

According to some exemplary embodiments, each patch antenna module includes four strip-shaped metal structures, two strip-shaped metal structures are located at the first side of the first radiating patch, and the other two strip-shaped metal structures are located at the second side, and a quadrangle formed by sequentially connecting first ends of the strip-shaped metal structures surrounds an orthographic projection of the first radiating patch onto the first surface of the first insulating medium substrate.

According to some exemplary embodiments, in at least one patch antenna module of the plurality of patch antenna modules, the metal sheet is a metal trace printed onto the second surface of the second insulating medium substrate, and metal traces attached to two strip-shaped metal structures located at a same side of the first radiating patch extend toward each other.

According to some exemplary embodiments, at least one patch antenna module of the plurality of patch antenna modules further includes a second radiating patch provided on the second surface of the second insulating medium substrate, an orthographic projection of the second radiating patch onto the first surface of the second insulating medium substrate falls within the first radiating patch.

According to some exemplary embodiments, a polygon formed by sequentially connecting first ends of the plurality of strip-shaped metal structures included in each patch antenna module surrounds an orthographic projection of the first radiating patch of a corresponding patch antenna module onto the first surface of the first insulating medium substrate.

According to some exemplary embodiments, distances respectively from centers of first ends of a plurality of strip-shaped metal structures included in each patch antenna module to a center of an orthographic projection of the first radiating patch of a corresponding patch antenna module onto the first surface of the first insulating medium substrate are between ⅕ to ⅓ of an operating wavelength of the corresponding patch antenna module.

BRIEF DESCRIPTION OF DRAWINGS

Hereinafter, exemplary embodiments of the present disclosure will be described in detail with reference to the drawings, in which.

Figure 1:
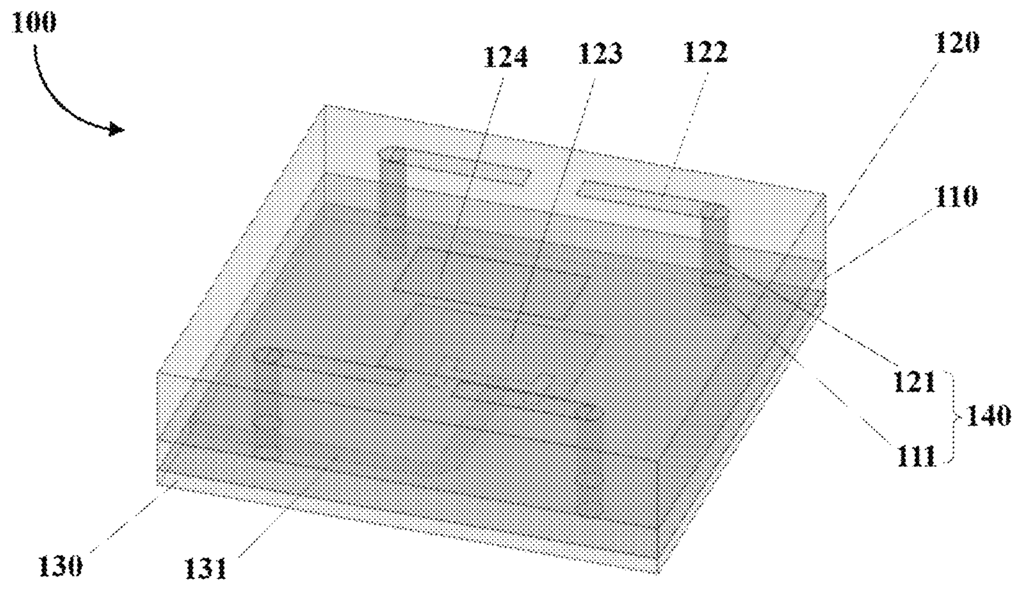
FIG. 1 schematically illustrates a structure of a patch antenna according to an exemplary embodiment of the present disclosure.

It should be understood that the drawings are merely schematic illustrations of exemplary embodiments of the present disclosure, but not limiting of the disclosure, nor are they necessarily drawn to scale. Furthermore, in the drawings, the same or similar features are indicated with the same or similar reference numerals.

DETAILED DESCRIPTION

Various exemplary embodiments of the present disclosure are described below in conjunction with the drawings to enable those skilled in the art to fully understand and implement the technical solutions according to the present disclosure.

Referring to FIG. 1, a structure of a patch antenna according to an exemplary embodiment of the present disclosure is schematically illustrated. As shown in FIG. 1, the patch antenna 100 includes a first insulating medium substrate 110, a second insulating medium substrate 120, and a wiring substrate 130. An orthographic projection of the patch antenna 100 onto the plane in which the wiring substrate 130 is located has a rectangular shape. It should be understood, however, that the orthographic projection of the patch antenna 100 onto the wiring substrate 130 may also have any other suitable shape, such as a rectangle with rounded corners, a square, a rhombus, a parallelogram, a trapezoid, and so on. The present disclosure does not impose any limitation on this aspect.

The first insulating medium substrate 110, the second insulating medium substrate 120, and the wiring substrate 130 may be formed of any suitable insulating material. As non-limiting examples, such insulating materials may include, for example, glass, plastic, and the like. A metal layer is provided on the bottom surface of the first insulating medium substrate 110, and a slit of H shape is provided in the metal layer for coupling feeding of the patch antenna 100. The second insulating medium substrate 120 is provided thereon with a first radiating patch 123 and a second radiating patch 124, wherein the first radiating patch 123 is located on the bottom surface of the second insulating medium substrate 120 and the second radiating patch 124 is located on the top surface of the second insulating medium substrate 120. However, it is also possible that the patch antenna includes fewer or more radiating patches, which will be described in detail below. A feeding line 131 is provided on the bottom surface of the wiring substrate 130. The first insulating medium substrate 110, the second insulating medium substrate 120 and the wiring substrate 130 are stacked together as shown in FIG. 1 (for example, the first insulating medium substrate 110, the second insulating medium substrate 120, and the wiring substrate 130 may be stacked together by bonding or adhesive). Thus, as shown in FIG. 1, the top surface of the wiring substrate 130 abuts against the bottom surface of the first insulating medium substrate 110, and the top surface of the first insulating medium substrate 110 abuts against the bottom surface of the second insulating medium substrate 120. It should be understood that while the patch antenna 100 shown in FIG. 1 includes a wiring substrate 130, this is not necessary. In other embodiments of the present disclosure, the patch antenna may not include the wiring substrate 130, as will be described in detail below.

With continued reference to FIG. 1, the patch antenna 100 further includes four vias 140 passing through the first insulating medium substrate 110 and the second insulating medium substrate 120, each via 140 includes a first via 111 in the first insulating medium substrate 110 and a second via 121 in the second insulating medium substrate 120. The first via 111 and the second via 121 are aligned with each other, and their hole walls are both covered with a metal layer, for example, are both plated with copper. A lower end of the via 140 (i.e., a lower end of the first via 111) is electrically connected to the metal layer on the bottom surface of the first insulating medium substrate 110, and an upper end of the via 140 (i.e., an upper end of the second via 121) is flush with the top surface of the second insulating medium substrate 120. The four our vias 140 are arranged as surrounding the first radiating patch 123 and being spaced apart therefrom, wherein two vias are located at one side of the first radiating patch 123 and the other two vias 140 are located at the opposite side of the first radiating patch 123. In some exemplary embodiments, a quadrangle formed by sequentially connecting lower ends of the four vias 140 may surround an orthographic projection of the first radiating patch 123 onto the bottom surface of the first insulating medium substrate 110. In other exemplary embodiments, a distance from the center of the lower end of each via 140 to the center of the orthographic projection of the first radiating patch 123 onto the bottom surface of the first insulating medium substrate 110 is between ⅕ to ⅓ of the operating wavelength of the patch antenna 100. As shown in FIG. 1, a metal sheet 122 is attached to the top end of each via 140. The metal sheets 122 attached to two vias 140 located at a same side of the first radiating patch 123 are bent towards each other and abutting against the top surface of the second insulating medium substrate 120, and the metal sheets 122 attached to two vias 140 located at the other side of the first radiating patch 123 are also bent towards each other and abutting against the top surface of the second insulating medium substrate 120. That is to say, the metal sheet 122 is bent to from an angle of 0 degrees with the top surface of the second insulating medium substrate 120. It should be understood that, in some embodiments, the metal sheet 122 may not be bent, or not necessarily bent to be against the top surface of the second insulating medium substrate 120, as will be described in detail below. It should also be understood that the metal layer, the metal sheet, and the like mentioned in the present disclosure may be made of any suitable metallic material, including but not limited to gold, copper, silver, aluminum and the like, the present disclosure does not impose any limitation thereto. Furthermore, it is shown in FIG. 1 that the cross-section of the via 140 may be circular, however, it should be understood that the cross-section of the via 140 may be any other suitable shape, such as rectangular, square, etc., and the present disclosure does not impose any limitation thereto.

In the patch antenna 100 shown in FIG. 1, the vias 140 located at either side of the first radiating patch 123 and the second radiating patch 124 and having the hole wall covered with a metal layer as well as the metal sheets 122 attached to the vias can constrain the electromagnetic wave when the patch antenna 100 is operating, thereby enabling the patch antenna 100 to obtain a wide beam width. Furthermore, the bending arrangement of the metal sheets 122 shown in FIG. 1 can also achieve a lower cross-sectional profile of the patch antenna 100, which facilitates applications of the patch antenna 100.

It should be understood that, according to some other exemplary embodiments of the present disclosure, the via 140 with the hole wall covered with a metal layer in the patch antenna 100 may be replaced by any suitable strip-shaped metal structure, such a strip-shaped metal structure may be implemented as a via (such as the via 140 shown in FIG. 1) or as other suitable structure (such as, but not limited to, a metal rod, a metal strip, or the like). The strip-shaped metal structure may be arranged as passing through the first insulating medium substrate 110 and the second insulating medium substrate 120, a first end thereof may likewise be electrically connected with the metal layer on the bottom surface of the first insulating medium substrate 110, a second end thereof may be flush with the top surface of the second insulating medium substrate 120, or may protrude from the top surface of the second insulating medium substrate 120. The second end of the strip-shaped metal structure is also attached to a corresponding metal sheet, such as the metal sheet 122 shown in FIG. 1. Therefore, the structure including the strip-shaped metal structure and the attached metal sheet can also realize a constraint on the electromagnetic wave when the patch antenna 100 is operating, as the vias 140 with the hole wall covered with a metal layer and the attached metal sheets 122 shown in FIG. 1, thereby enabling the patch antenna 100 to obtain a wide beam width. In some exemplary embodiments, the patch antenna may include a plurality of strip-shaped metal structures, which are arranged such that at least two strip-shaped metal structures are located at a first side of a first radiating patch (e.g., the first radiating patch 123 shown in FIG. 1) and at least two strip-shaped metal structures are located at a second side of the first radiating patch opposite to the first side. Metal sheets attached to two strip-shaped metal structures that are furthest apart from each other among the at least two strip-shaped metal structures located at the first side are bent towards each other, metal sheets attached to two strip-shaped metal structures that are furthest apart from each other among the at least two strip-shaped metal structures located at the second side are also bent towards each other, and the bent metal sheet forms an angle greater than or equal to 0 degrees and less than 90 degrees with the second surface of the second insulating medium substrate.

Figure 2:
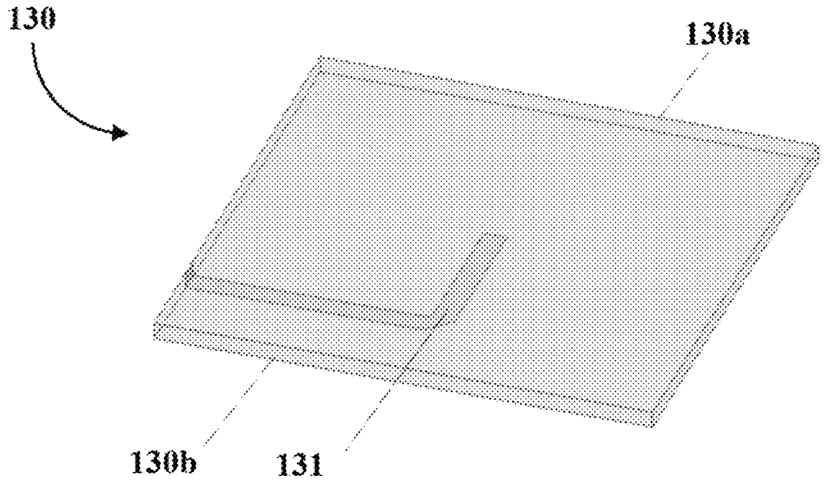
FIG. 2 schematically illustrates some details of the patch antenna shown in FIG. 1.

Referring to FIG. 2 in conjunction with FIG. 1, FIG. 2 schematically illustrates the structure of the wiring substrate 130 in the patch antenna 100 shown in FIG. 1. The wiring substrate 130 includes a top surface 130*a* and a bottom surface 130*b*. A feeding line 131 is provided on the bottom surface 130*b*, which is electrically connected to the metal layer on the first insulating medium substrate 110 by a line located on a side surface of the wiring substrate 130 so as to transmit an electrical signal thereto. The feeding line 131 shown in FIG. 2 has a generally L-shape, however this is as an example only and not restrictive. The feeding line 131 may have any suitable form according to actual needs. Furthermore, it should be understood that, in some exemplary embodiments, the feeding lines 131 may also be provided on the top surface 130*a* of the wiring substrate 130.

Figure 3:
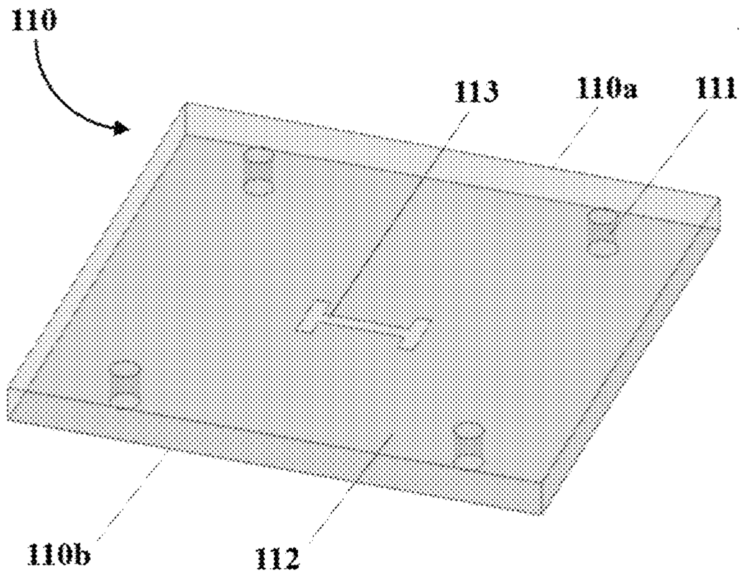
FIG. 3 schematically illustrates some details of the patch antenna shown in FIG. 1.

Referring to FIG. 3 in conjunction with FIGS. 1 and 2, FIG. 3 schematically illustrates the structure of the first insulating medium substrate 110 in the patch antenna 100 shown in FIG. 1. The first insulating medium substrate 110 includes a top surface 110*a* and a bottom surface 110*b*. A metal layer 112 is provided on the bottom surface 110*b*. It is shown in FIG. 3 that the entire bottom surface 110*b* is covered by the metal layer 112. But this is not necessary, in other embodiments, the metal layer 112 may cover only a portion of the bottom surface 110*b*, as desired. The patch antenna 100 shown in FIG. 1 employs a coupling feeding manner, so that the metal layer 112 can be electrically connected to the feeding line 131 in the wiring substrate 130 so as to be used as a feeding layer. However, in other embodiments, the metal layer 112 may be grounded to serve as a ground layer, for example, when other feeding manners are employed, such as direct feeding or coaxial cable feeding, and the wiring substrate 130 may be omitted in these non-coupling feeding situations, as will be described in detail below. A slit 113 is provided in the metal layer 112. The slit 113 shown in FIG. 3 has an H-shape. However, it should be understood that the slit 113 may have any other suitable shape and the present disclosure does not impose any limitation in this regard. The first insulating medium substrate 110 is further provided with a first via 111 passing therethrough, a hole wall of the first via 111 is covered with a metal layer, such as plated copper, a lower end of the first via 111 is electrically connected with the metal layer 112.

Figure 4:
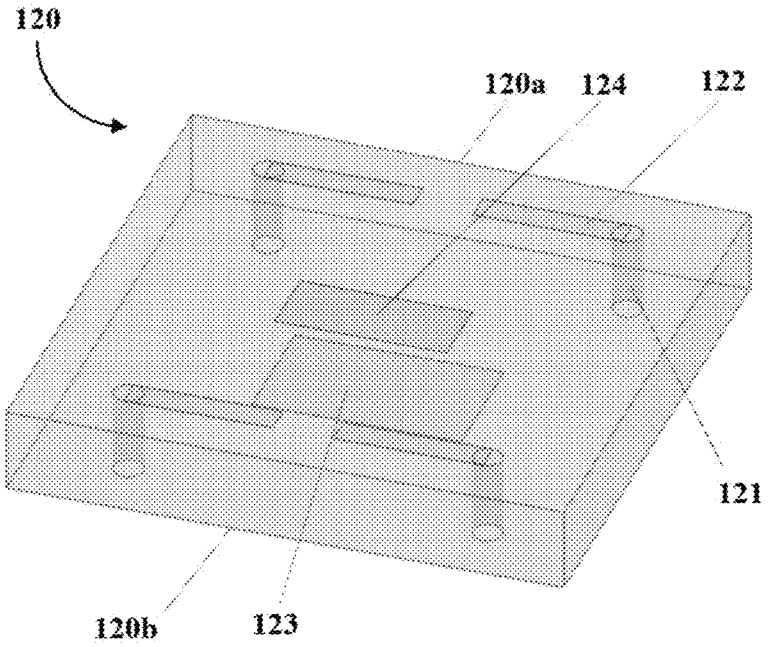
FIG. 4 schematically illustrates some details of the patch antenna shown in FIG. 1.

Referring to FIG. 4 in conjunction with FIGS. 1, 2 and 3, FIG. 4 schematically illustrates the structure of the second insulating medium substrate 120 in the patch antenna 100 shown in FIG. 1. The second insulating medium substrate 120 includes a top surface 120*a* and a bottom surface 120*b*. A first radiating patch 123 is provided on the bottom surface 120*b*, and a second radiating patch 124 is provided on the top surface 120*a*, wherein an orthographic projection of the second radiating patch 124 onto the bottom surface 120*b* of the second insulating medium substrate 120 falls within a range of the first radiating patch 123. In other embodiments, the orthographic projection of the second radiating patch 124 onto the bottom surface 120*b* of the second insulating medium substrate 120 may coincide or partially overlap with the first radiating patch 123. The first radiating patch 123 and the second radiating patch 124 may be made of any suitable metallic material including, but not limited to, gold, silver, copper, aluminum, and the like. The second insulating medium substrate 120 is also provided therein with a second via 121 passing therethrough, a hole wall of the second via 121 is covered with a metal layer, such as plated copper. The second via 121 is aligned with the corresponding first via 111 in the first insulating medium substrate 110, thereby forming a corresponding via 140. The metal sheet 122 is attached to the upper end of the second via 121, and is bent at an angle of 0 degrees with respect to the top surface 120*a* of the second insulating medium substrate 120, thereby causing the metal sheet 122 to abut against the top surface 120*a* of the second insulating medium substrate 120, in such a manner that the patch antenna 100 may have a lower cross-sectional profile. In some embodiments, the metal sheet 122 may be a metal trace printed onto the top surface 120*a* of the second insulating medium substrate 120, thereby simplifying the manufacturing process and reducing the manufacturing cost while enabling the patch antenna 100 to have a lower cross-sectional profile. It should also be understood that the second insulating medium substrate 120 shown in FIG. 4 has a dual-layer patch arrangement for the radiating patch, which in this manner can improve the bandwidth of the patch antenna 100. However, a patch arrangement with fewer or more layers is also possible, which will be described in detail below.

Figure 5A:
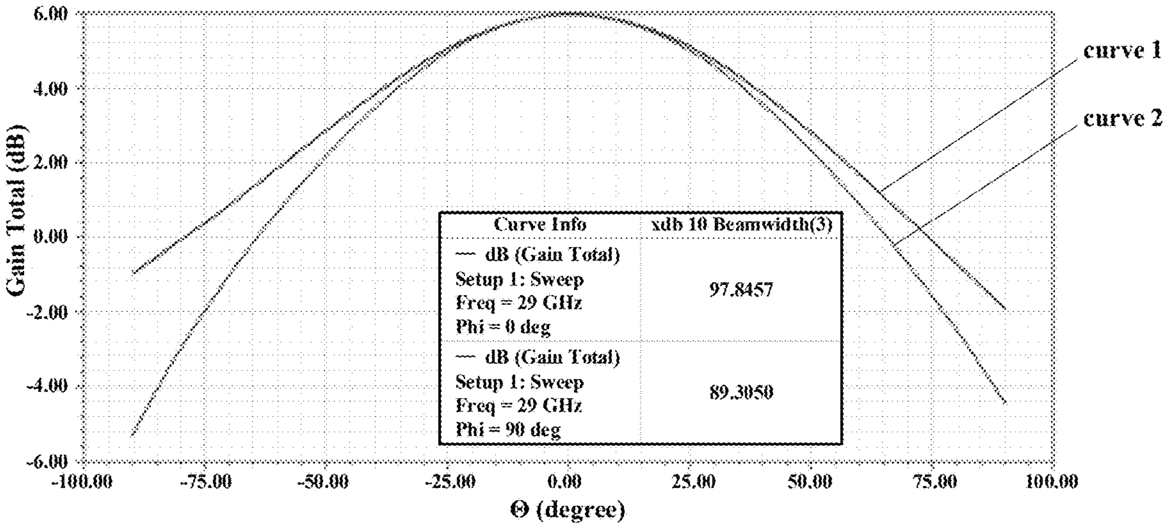
FIGS. 5*a* and 5*b* schematically illustrate simulation results when performing simulations on a conventional patch antenna and a patch antenna according to the present disclosure, respectively.
Figure 5B:
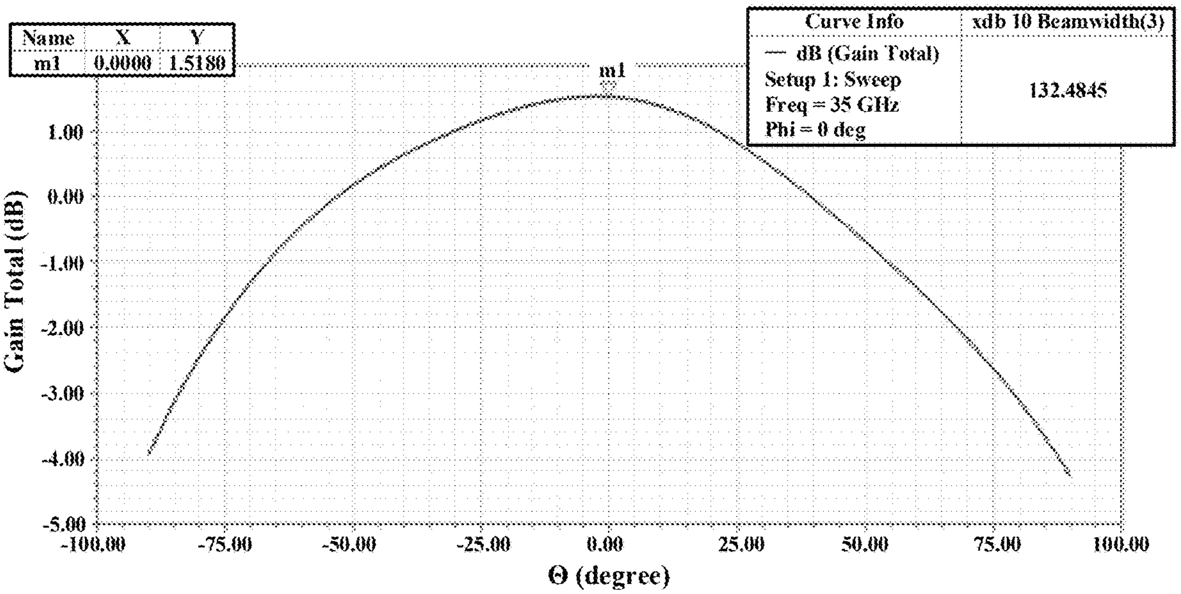

Referring to FIGS. 5*a* and 5*b*, simulation results for a conventional patch antenna and a patch antenna according to the present disclosure are schematically illustrated, respectively. FIG. 5*a* schematically illustrates a beam width resulting from a simulation performed on a conventional patch antenna, wherein: curve 1 shows the gain of a conventional patch antenna with respect to different vertical plane angles Θ ($-90° \leq \Theta \leq 90°$) in the situation that the applied electric signal has a frequency of 29 GHz and its electric field oscillation plane is a plane with a horizontal plane angle Φ of 0 degrees (i.e., the XOZ plane when the Z-axis is pointing in the vertical direction in a XYZ space, accordingly, the YOZ plane is the plane with a horizontal plane angle Φ of 90 degrees), wherein the beam width of the conventional patch antenna is about 97.8 degrees as seen from curve 1; and curve 2 shows the gain of the conventional patch antenna with respect to different vertical plane angles Θ ($-90° \leq \Theta \leq 90°$) in the situation that the frequency of the applied electric signal is 29 GHz and the electric field oscillation plane thereof is a plane with a horizontal plane angle Φ of 90 degrees (i.e., the YOZ plane in a XYZ space), wherein the beam width of the conventional patch antenna in this situation is about 89.3 degrees as seen from curve 2. That is, the beam width of a conventional patch antenna is typically less than 120 degrees, such that more than three patch antennas are required to achieve omnidirectional coverage of 360 degrees when forming an omnidirectional antenna array. FIG. 5*b* schematically shows a beam width resulting from a simulation performed on a patch antenna according to the present disclosure, the curve therein shows the gain of a patch antenna according to the present disclosure with respect to different vertical plane angles Θ ($-90° \leq \Theta \leq 90°$) in the situation that an applied electrical signal has a frequency of 35 GHz and an electric field oscillation plane thereof is a plane with a horizontal plane angle Φ of 0 degrees. As can be seen from this curve, the beam width of the patch antenna according to the present disclosure in this situation is about 132.4 degrees. It can be seen that the patch antenna according to the present disclosure can significantly increase its beam width, so that in the situation shown in FIG. 5*b*, only three patch antennas according to the present disclosure are needed to achieve omnidirectional coverage of 360 degrees.

It should be understood that, the bending of the metal sheet 122 in the patch antenna 100 according to the present disclosure should enable two vias 140 located at a same side of the radiating patch and the attached metal sheets 122 to form a constraint on the electromagnetic field. That is, in order to be able to constrain the electromagnetic field of the patch antenna, neither of the two metal sheets 122 at the same side of the radiating patch is bent, instead extends along a direction perpendicular to the top surface of the second insulating medium substrate, or the two metal sheets 122 are bent towards each other when bending is required (e.g. in the situation for obtaining a patch antenna with a lower cross-section profile); otherwise they may result in an inability to constrain the electromagnetic field of the patch antenna and consequently an inability to increase the beam width of the patch antenna.

Figure 6A:
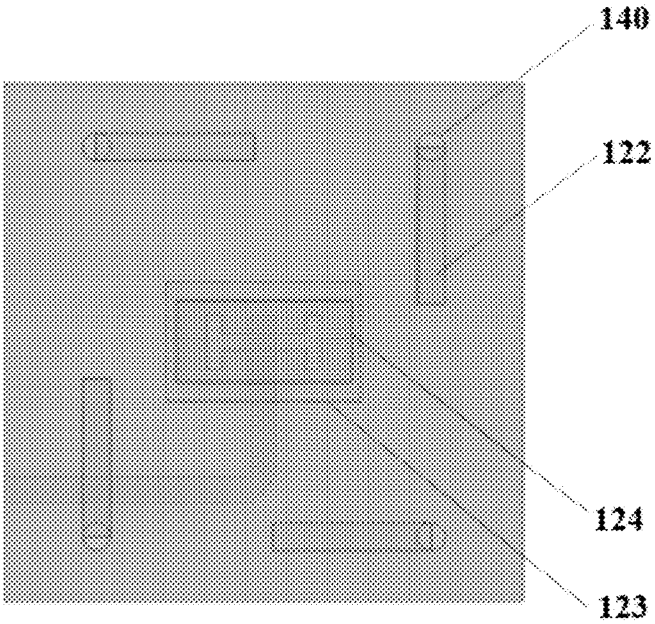
FIG. 6*a* schematically illustrates a situation that two metal sheets at a same side of a radiating patch in the patch antenna are not bent towards each other.
Figure 6B:
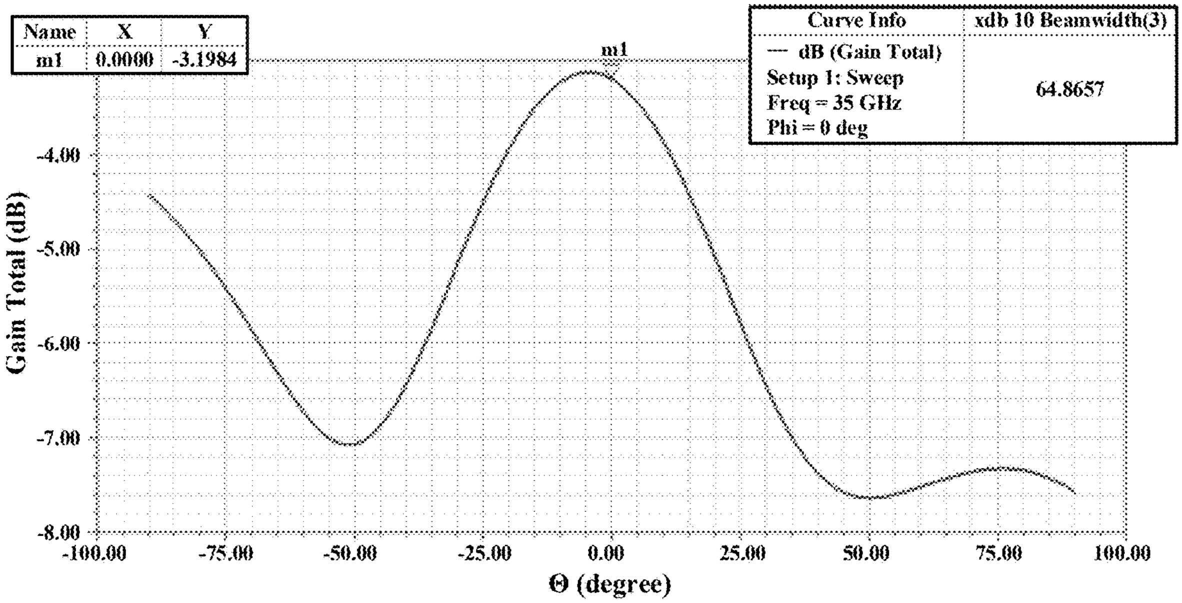
FIG. 6*b* schematically illustrates simulation results when performing simulations on a patch antenna with the bending situation of the metal sheets shown in FIG. 6*a;*

Referring to FIGS. 6*a* and 6*b*, a situation that two metal sheets at a same side of a radiating patch in a patch antenna are not bent towards each other and a simulation result of the patch antenna are illustrated. As shown in FIG. 6*a*, the two metal sheets 122 located at the same side of the radiation patch in the patch antenna are not bent towards each other, but one metal sheet 122 extends in a direction from left to right in the figure, and the other adjacent metal sheet 122 extends in a direction from top to bottom. Therefore, the bending of the two metal sheets 122 at the same side of the radiating patch cannot form a constraint on the electromagnetic field, resulting in an inability to increase the beam width of the patch antenna. FIG. 6*b* schematically shows a simulation result of the patch antenna with the metal sheets bending situation shown in FIG. 6*a*. The cure in FIG. 6*b* shows the gain of the patch antenna with the metal sheets bending situation shown in FIG. 6*a* for different vertical plane angles Θ(−90°≤Θ≤90°) in the situation that an applied electrical signal having a frequency of 35 GHz and an electric field oscillation plane thereof is a plane with a horizontal plane angle Φ of 0 degrees. As can be seen from this curve, in the situation that a patch antenna includes the metal sheets having the bend shown in FIG. 6*a*, the beam width of the patch antenna is only about 64.8 degrees.

Figure 7:
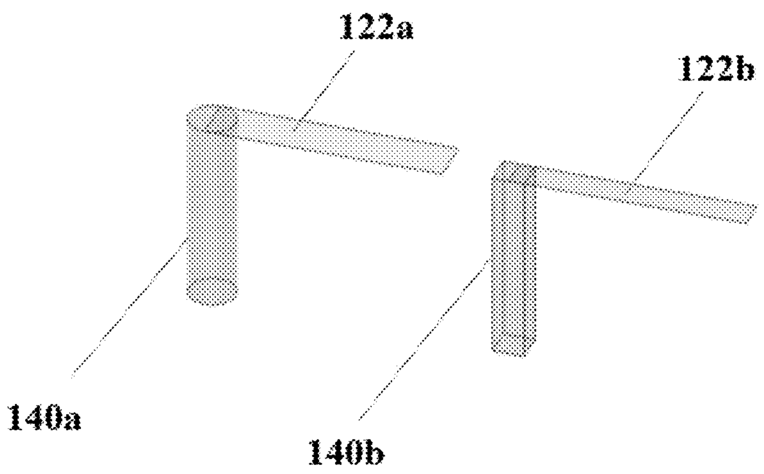
FIG. 7 schematically illustrates some details of a patch antenna according to another exemplary embodiment of the present disclosure.

Referring to FIG. 7, some details of a patch antenna according to another exemplary embodiment of the present disclosure are schematically illustrated. As shown in FIG. 7, the strip-shaped metal structure included in the patch antenna according to the present disclosure may have a different cross section. The strip-shaped metal structure 140*a* may be circular in cross-section and the strip-shaped metal structure 140*b* may be rectangular in cross-section, with the metal sheets 122*a*, 122*b* attached at their top ends, respectively. In some example embodiments, the metal sheets 122*a*, 122*b* may likewise be implemented as metal traces printed onto the top surface 120*a* of the second insulating medium substrate 120. It should be understood that for the strip-shaped metal structures 140*a*, 140*b*, the upper ends thereof may not be flush with the top surface of the second insulating medium substrate, but may continue to extend so as to protrude from the top surface. It should be understood that the strip-shaped metal structures 140*a*, 140*b* may be implemented as the vias 140 with hole walls covered with a metal layer in the patch antenna 100 shown in FIG. 1, and in other examples, the strip-shaped metal structures 140*a*, 140*b* may be implemented as metal rods, which may be embedded in vias passing through, for example, the first and second insulating medium substrates in the patch antenna 100.

Figure 8:
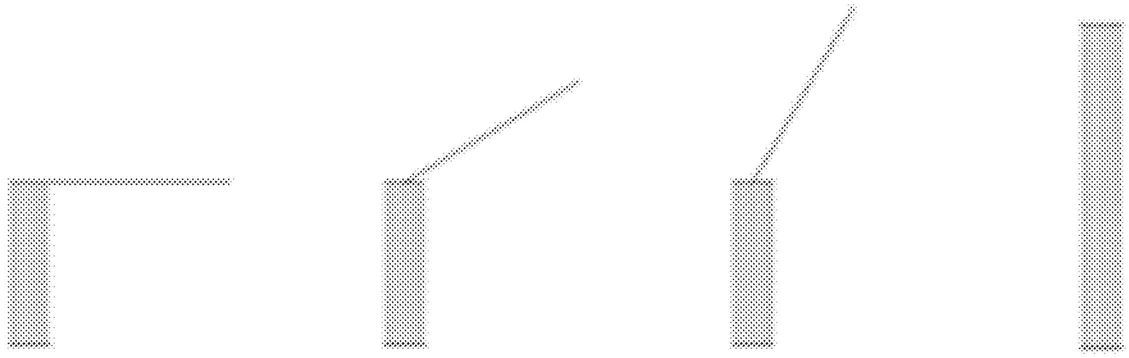
FIG. 8 schematically illustrates some details of a patch antenna according to another exemplary embodiment of the present disclosure.

Referring to FIG. 8, some details of a patch antenna according to another exemplary embodiment of the present disclosure are schematically illustrated. As shown in FIG. 8, a metal sheet attached to a second end of a strip-shaped metal structure may also have a bend with other angles. For example, from the left to the right in the figure, four bending situations of the metal sheet are shown, wherein in the left-most situation the metal sheet is bent at an angle of 0 degrees with respect to the top surface of the second insulating medium substrate, and in the right-most situation the metal sheet is not bent (or the metal sheet is at an angle of 90 degrees with respect to the top surface of the second insulating medium substrate). The wide beam effect of a patch antenna may be achieved with metal sheets having different bend angles, but different bend angles may result in patch antennas having different cross-sectional profiles. Thus, in applications requiring a patch antenna having a lower cross-sectional profile, the metal sheet may be bent at an angle of 0 degrees with respect to the top surface of the second insulating medium substrate. It should also be understood that, in the situation that the metal sheet is bent at an angle of 0 degrees with respect to the top surface of the second insulating medium substrate, the metal sheet can be realized as a metal trace printed onto the top surface of the second insulating medium substrate, in such a manner that not only a low cross-sectional profile of the patch antenna is realized, but also the difficulty of the manufacturing process can be reduced, and the manufacturing cost can be reduced accordingly.

Figure 9:
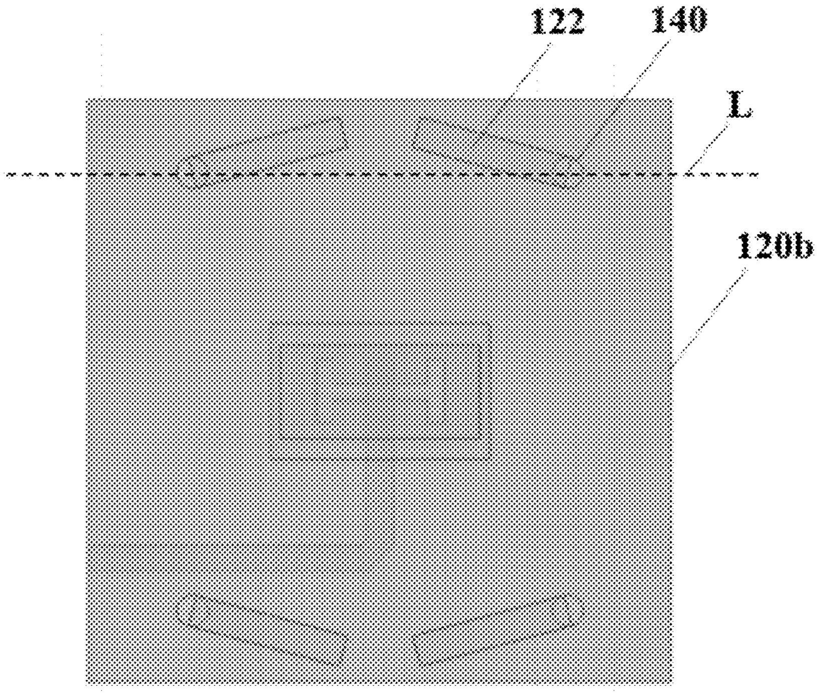
FIG. 9 schematically illustrates some details of a patch antenna according to another exemplary embodiment of the present disclosure.

Referring to FIG. 9 in conjunction with FIG. 1, some details in a patch antenna according to another exemplary embodiment of the present disclosure are schematically illustrated. As shown in FIG. 9, in the situation that the metal sheet 122 is bent at an angle of 0 degrees with respect to the top surface 120*b* of the second insulating medium substrate 120 so as to abut against the top surface 120*b* of the second insulating medium substrate 120, or in the situation that the metal sheet 122 is implemented as a metal trace printed onto the top surface 120*b*, the metal sheet 122 may be further arranged as being deflected with respect to the line L formed by connecting the top ends of the vias 140, for example, being deflected away from the radiating patch, in the range of greater than 0 degrees and less than or equal to 10 degrees. It should be understood that in other exemplary embodiments, the metal sheet 122 may be further arranged as being deflected towards the radiating patch with respect to the line L between the top ends of the vias 140, and the deflecting angle ranges from greater than 0 degrees and less than or equal to 10 degrees.

Figure 10A:
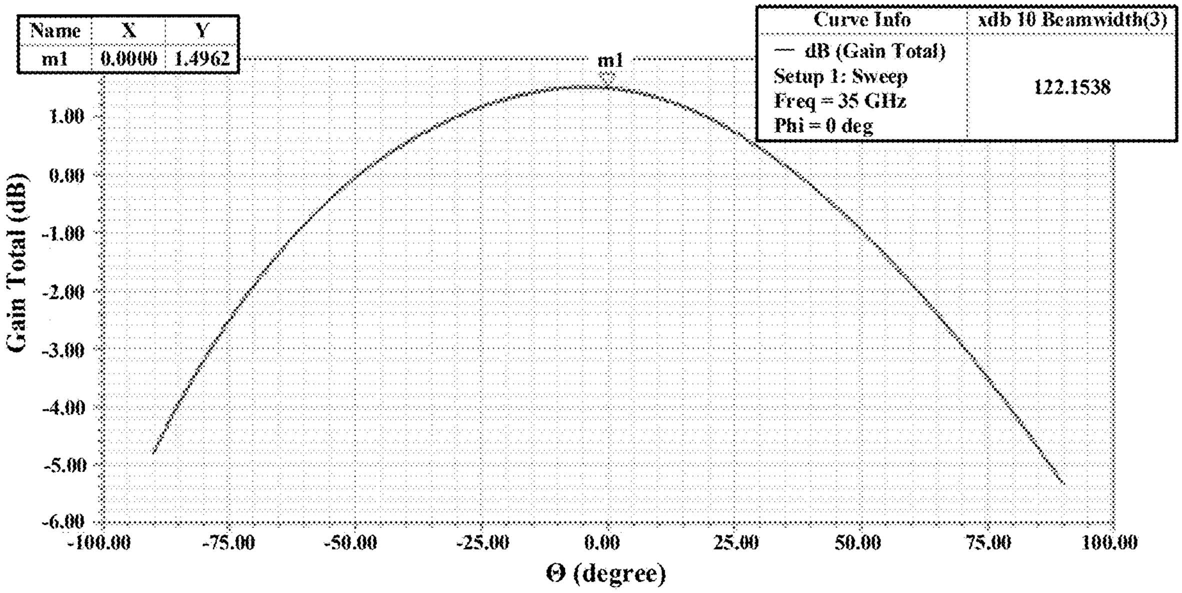
FIGS. 10*a* and 10*b* schematically illustrates simulation results when performing simulations on a patch antenna with different deflecting angles of a metal sheet, respectively.
Figure 10B:
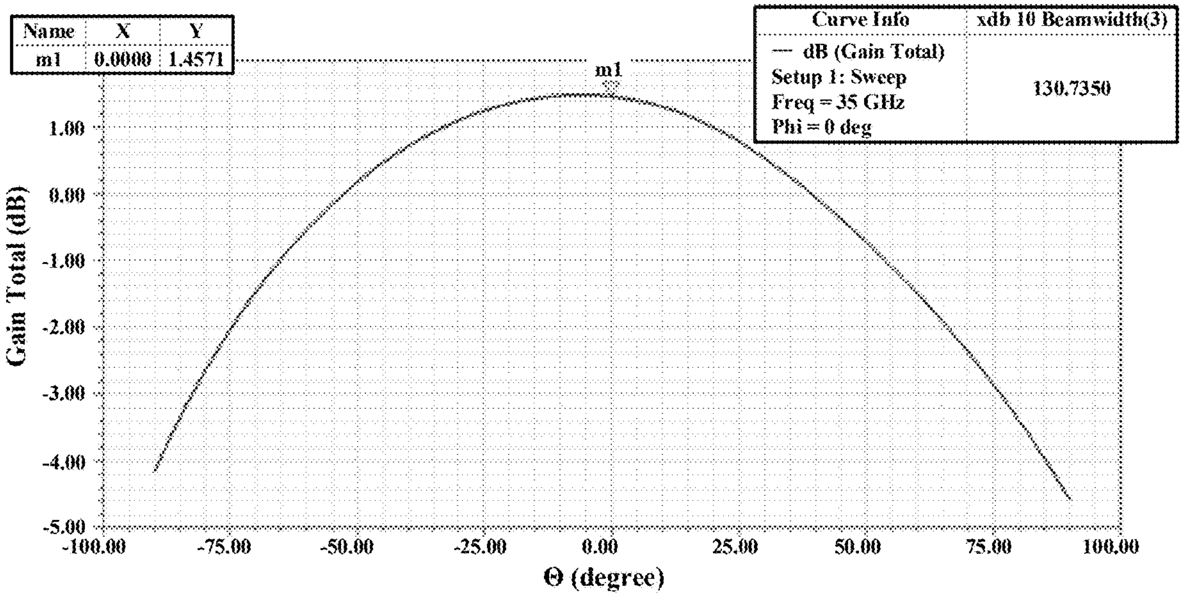

Referring to FIGS. 10*a* and 10*b*, simulation results for a patch antenna with different deflecting angles of the metal sheet are schematically illustrated, respectively. FIG. 10*a* shows the beam width of the patch antenna with the metal sheet 122 deflected away from the radiating patch with a deflecting angle of 10 degrees in the deflection situation as shown in FIG. 9, wherein the patch antenna has the structure as shown in FIG. 1. The curve in FIG. 10*a* shows the gain of the patch antenna with respect to different vertical plane angles Θ (−90°≤Θ≤90°) when the applied electrical signal has a frequency of 35 GHz and its electric field oscillation plane is a plane with a horizontal plane angle Φ of 0 degrees. As can be seen in FIG. 10*a*, at this time, the beam width of the patch antenna is about 122.1°. FIG. 10*b* shows the beam width of a patch antenna with the metal sheet 122 deflected away from the radiating patch with a deflecting angle of 5 degrees in the deflection situation as shown in FIG. 9, wherein the patch antenna has the structure as shown in FIG. 1. The curve in FIG. 10*b* shows the gain of the patch antenna with respect to different vertical plane angles Θ (−90°≤Θ≤90°) when the applied electrical signal has a frequency of 35 GHz and its electric field oscillation plane is a plane with a horizontal plane angle Φ of 0 degrees. At this time, the beam width of the patch antenna is about 130.7°. As can be seen from FIGS. 10*a* and 10*b*, the smaller the deflecting angle at which the metal sheet 122 is deflected with respect to the line L between the top ends of the vias 140, the larger the beam width of the patch antenna.

Figure 11A:
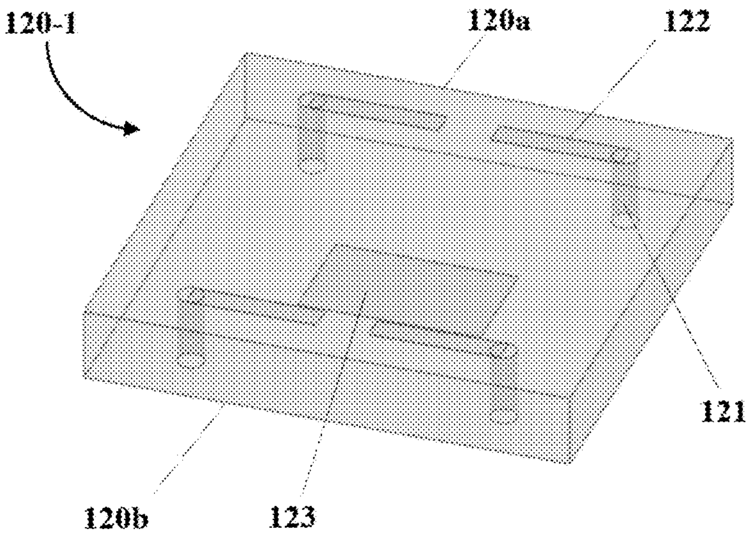
FIGS. 11*a* and 11*b* schematically illustrate some details of patch antennas according to further exemplary embodiments of the present disclosure, respectively.
Figure 11B:
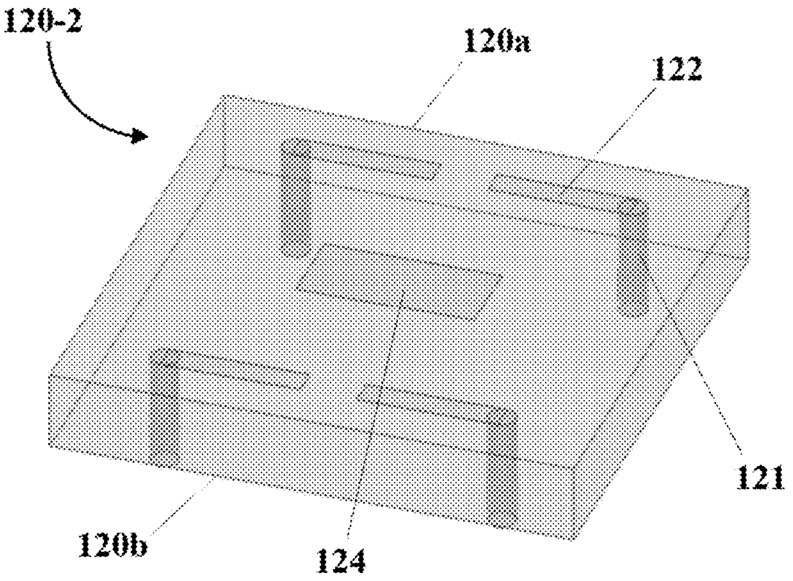

Referring to FIGS. 11*a* and 11*b*, some details in patch antennas according to some other exemplary embodiments of the present disclosure are schematically illustrated, respectively. As shown in FIG. 11*a*, the second insulating medium substrate 120 of the patch antenna 100 in FIG. 1 may be replaced with the second insulating medium substrate 120-1 shown in FIG. 11*a*. The second insulating medium substrate 120-1 differs from the second insulating medium substrate 120 only in that the second insulating medium substrate 120-1 has only the first radiating patch 123 provided on the bottom surface 120*b*. As shown in FIG. 11*b*, the second insulating medium substrate 120 in the patch antenna 100 in FIG. 1 may also be replaced with the second insulating medium substrate 120-2 shown in FIG. 11*b*. The second insulating medium substrate 120-2 differs from the second insulating medium substrate 120 only in that the second insulating medium substrate 120-2 has only the second radiating patch 124 disposed on the top surface 120*a*.

Accordingly, the patch antenna including the second insulating medium substrate 120-1 or 120-2 has a single-layer radiating patch arrangement.

Figure 12:
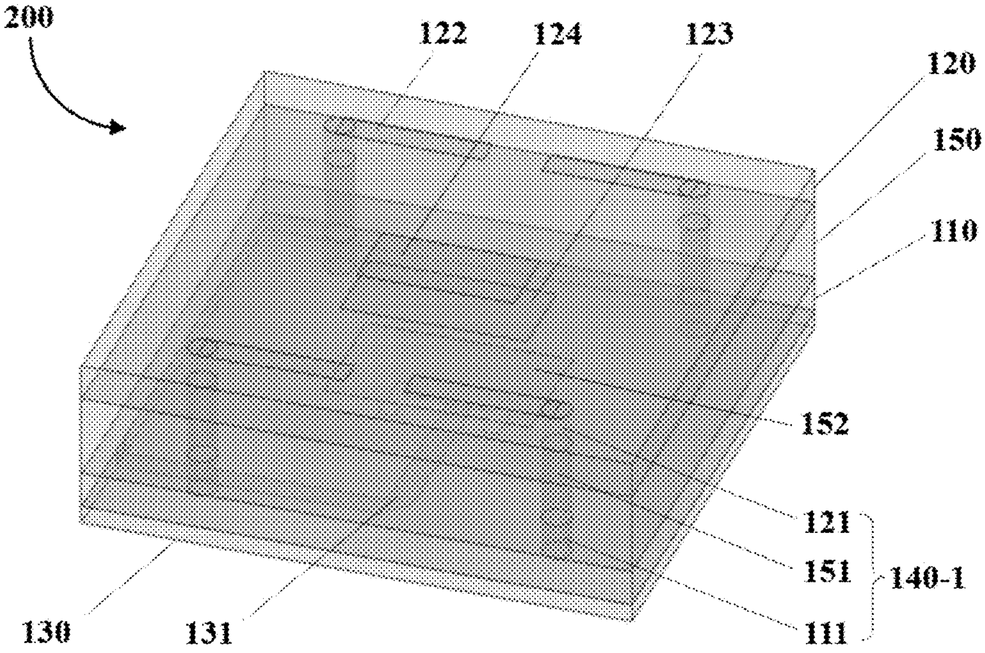
FIG. 12 schematically illustrates a structure of a patch antenna according to another exemplary embodiment of the present disclosure.

Referring to FIG. 12, a structure of a patch antenna according to another exemplary embodiment of the present disclosure is schematically illustrated. As shown in FIG. 12, the patch antenna 200 is different from the patch antenna 100 shown in FIG. 1 only in that the patch antenna 200 further includes an intermediate insulating medium substrate 150 positioned between the first insulating medium substrate 110 and the second insulating medium substrate 120. The intermediate insulating medium substrate 150 may be formed of any suitable insulating material, which may include, as non-limiting example, glass, plastic, or the like. The intermediate insulating medium substrate 150 in FIG. 12 includes an intermediate via 151 and an intermediate radiating patch 152. The hole wall of the intermediate via 151 is also covered with a metal layer (e.g., plated copper), and the intermediate via 151 is aligned with the first via 111 and the second via 121, together forming the via 140-1 passing through the first insulating medium substrate 110, the intermediate insulating medium substrate 150, and the second insulating medium substrate 120. The intermediate radiating patch 152 may be provided on the bottom surface of the intermediate insulating medium substrate 150, and its orthographic projection onto the bottom surface 120*b* of the second insulating medium substrate 110 at least partially overlaps with the first radiating patch 123. The intermediate radiating patch 152 may be formed of any suitable metallic material including, but not limited to, gold, silver, copper, aluminum, and the like. It should be understood that in other embodiments, more than one intermediate insulating medium substrate 150 may be provided between the first insulating medium substrate 110 and the second insulating medium substrate 120, and accordingly, more than one intermediate radiating patch 152 may be included. The present disclosure does not impose any limitation on the number of intermediate insulating medium substrates (and accordingly, the number of intermediate radiating patches). Thus, the patch antenna 200 shown in FIG. 12 has a multi-layer radiating patch arrangement that is advantageous to further improve the bandwidth of the patch antenna.

Figure 13:
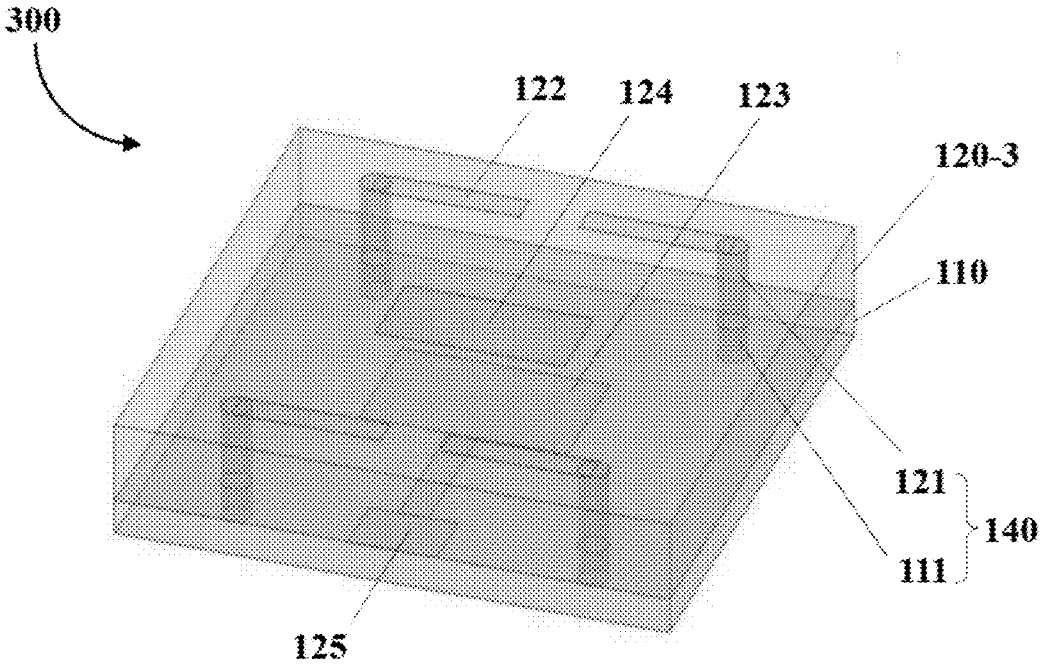
FIG. 13 schematically illustrates a structure of a patch antenna according to another exemplary embodiment of the present disclosure.

Referring to FIG. 13, a structure of a patch antenna according to another exemplary embodiment of the present disclosure is schematically illustrated. As shown in FIG. 13, the patch antenna 300 includes a first insulating medium substrate 110 and a second insulating medium substrate 120-3. The structure of the first insulating medium substrate 110 in the patch antenna 300 is the same as the structure of the first insulating medium substrate 100 in the patch antenna 100 shown in FIG. 1, and thus, the description thereabout is not repeated here. The structure of the second insulating medium substrate 120-3 in the patch antenna 300 is different from the structure of the second insulating medium substrate 120 in the patch antenna 100 shown in FIG. 1 only in that a feeding line 125 is further provided on the bottom surface of the second insulating medium substrate 120-3, and the feeding line 125 is electrically connected with the first radiating patch 123. It can be seen that the patch antenna 300 shown in FIG. 13 employs a direct-connected feeding to the first radiating patch 123. In this manner, the wiring substrate may be removed from the patch antenna 300 such that the patch antenna 300 may have a lower cross-sectional profile.

Figure 14:
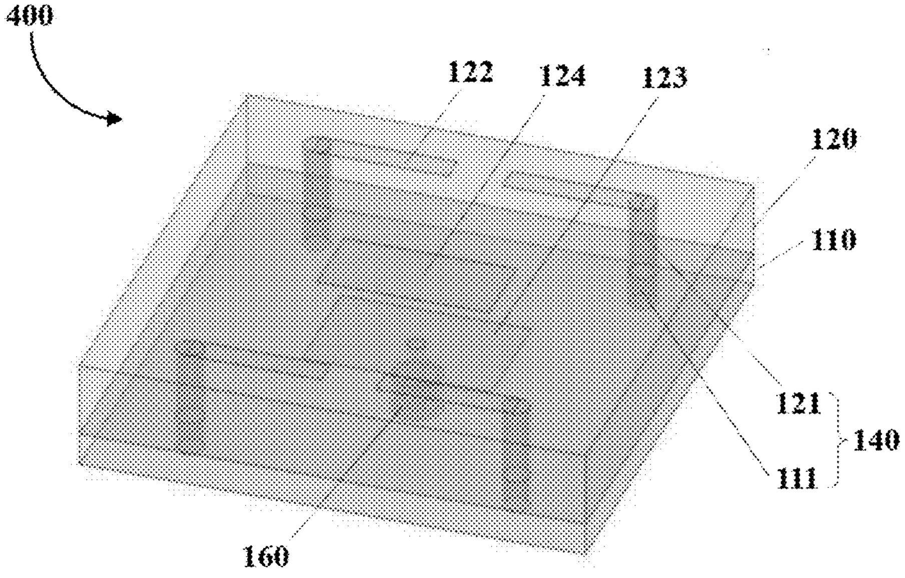
FIG. 14 schematically illustrates a structure of a patch antenna according to another exemplary embodiment of the present disclosure.

Referring to FIG. 14, a structure of a patch antenna according to another exemplary embodiment of the present disclosure is schematically illustrated. As shown in FIG. 14, the patch antenna 400 includes a first insulating medium substrate 110, a second insulating medium substrate 120, and a coaxial cable line 160. The first insulating medium substrate 110 and the second insulating medium substrate 120 in the patch antenna 400 have the same structure as the first insulating medium substrate 100 and the second insulating medium substrate 120 in the patch antenna 100 shown in FIG. 1, and thus, the description thereabout is not repeated here. The coaxial cable line 160 passes through the first insulating medium substrate 110, and the coaxial cable line 160 is arranged such that an outer conductor thereof is electrically connected with a metal layer on a bottom surface of the first insulating medium substrate 110, and the metal layer can be grounded at this time to serve as a ground layer, and an inner conductor of the coaxial cable line 160 is electrically connected with the first radiating patch 123. It can be seen that the patch antenna 400 shown in FIG. 14 employs a coaxial feeding to the first radiating patch 123. In this manner, the wiring substrate may be removed from the patch antenna 400 such that the patch antenna 400 may have a lower profile. Also, interference can be better eliminated in the patch antenna 400, because a coaxial cable line is used for feeding.

It should be understood that the various structural features of the patch antennas according to the present disclosure described above in connection with FIGS. 1 to 5*b* and FIGS. 7 to 14 may be arbitrarily combined without departing from the technical principle, and the technical solutions obtained by combining the structural features are also within the scope of the present disclosure.

Figure 15:
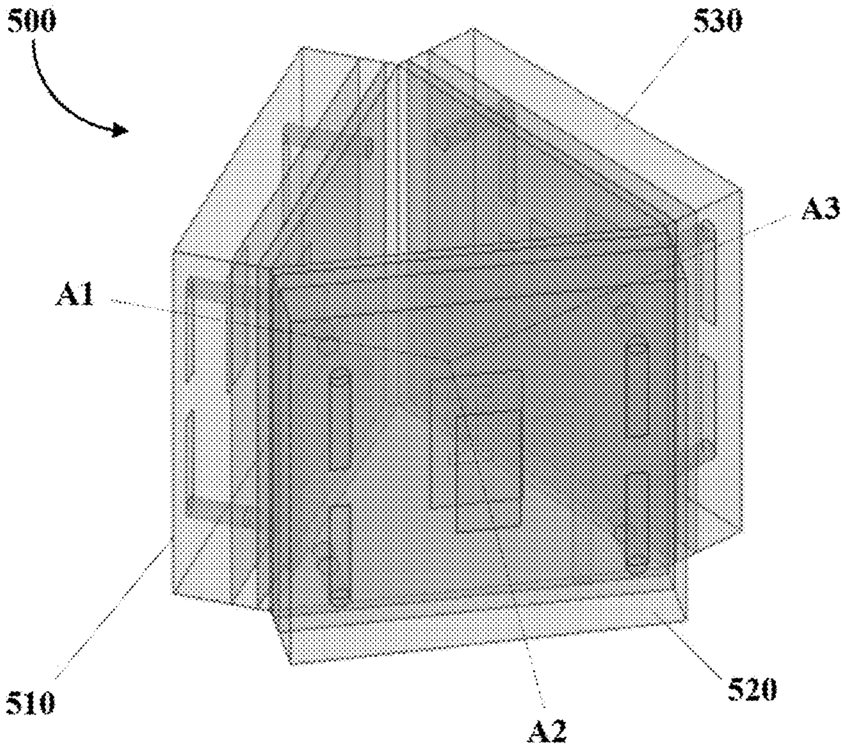
FIG. 15 schematically illustrates a structure of an omnidirectional antenna array according to an exemplary embodiment of the present disclosure.

Referring to FIG. 15, a structure of an omnidirectional antenna array according to an exemplary embodiment of the present disclosure is schematically illustrated. As shown in FIG. 15, the omnidirectional antenna array 500 includes three patch antennas 510, 520, and 530 arranged such that axis lines A1, A2, A3 each passing through a center of a respective patch antenna and extending along a normal direction of the first insulating medium substrate and the second insulating medium substrate thereof intersect at a point, an angle between two adjacent axis lines is 120 degrees, and the three patch antennas are in contact with each other. In some exemplary embodiments, a distance between centers of two adjacent patch antennas is less than ¼ of an operating wavelength of the patch antennas.

It should be understood that each of the three patch antennas 510, 520, and 530 may be implemented to have the same structure as the patch antenna 100 shown in FIG. 1. For example, each of the three patch antennas 510, 520, and 530 may include a first insulating medium substrate 110, a second insulating medium substrate 120, and a wiring substrate 130, an orthographic projection of the patch antenna 100 onto the wiring substrate 130 has a rectangular shape, a bottom surface of the first insulating medium substrate 110 is provided with a metal layer, and the metal layer is provided with an H-shaped slit therein for coupled feeding for the patch antenna 100, the second insulating medium substrate 120 is provided with a first radiating patch 123 and a second radiating patch 124 thereon, the first radiating patch 123 is located on the bottom surface of the second insulating medium substrate 120, a second radiating patch 124 is located on a top surface of the second insulating medium substrate 120, a feeding line 131 is provided on the bottom surface of the wiring substrate 130, the first insulating medium substrate 110, the second insulating medium substrate 120, and the wiring substrate 130 are stacked together as shown in FIG. 1 such that the top surface of the wiring substrate 130 abuts against the bottom surface of the first insulating medium substrate 110, and the top surface of the first insulating medium substrate 110 abuts against the bottom surface of the second insulating medium substrate 120. It should also be understood that the various features of the patch antennas described above in connection with the exemplary embodiments shown in FIGS. 1 to 5*b* and 7 to 14, as well as other embodiments mentioned in the specification, may also be incorporated into the patch antennas 510, 520 and 530, respectively.

Figure 16:
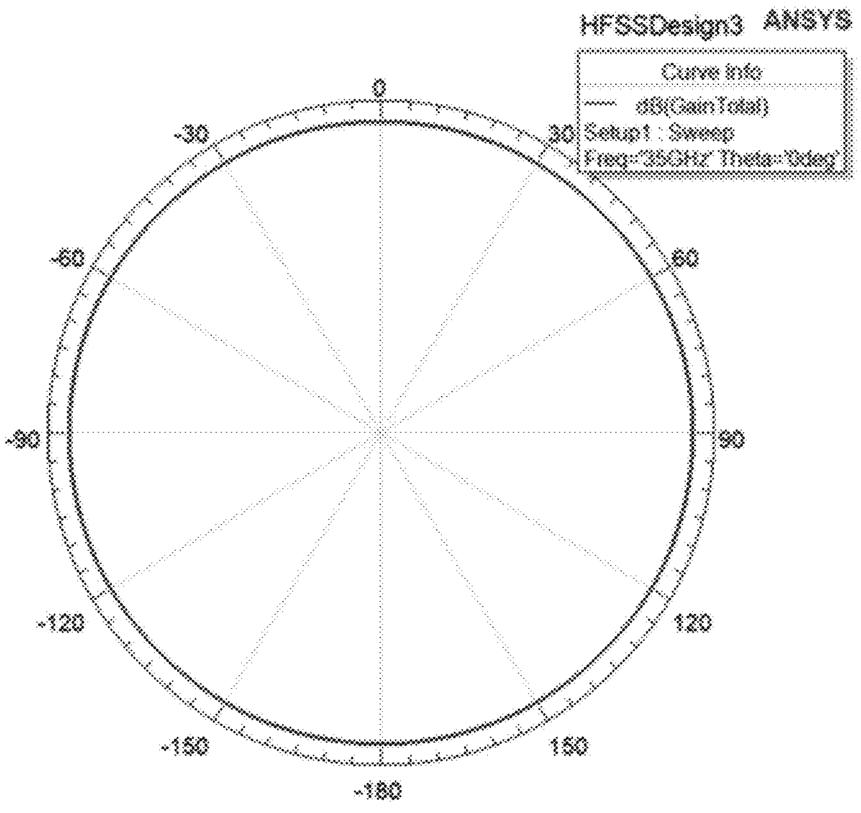
FIG. 16 schematically illustrates simulation results when performing simulations on the omnidirectional antenna array shown in FIG. 15.

Referring to FIG. 16, a simulation result for the omnidirectional antenna array shown in FIG. 15 is schematically illustrated. As shown in FIG. 16, the curve shows the gain of an omnidirectional antenna array with respect to a horizontal plane angle Φ (0°≤Φ≤360°) when an applied electrical signal has a frequency of 35 GHz and its electric field oscillation plane is a plane with a vertical plane angle Θ of 0 degrees. As can be seen, the omnidirectional antenna array 500 shown in FIG. 15 achieves horizontal omnidirectional coverage (i.e., the coverage is achieved for a full range of 360 degrees of horizontal plane angle Φ) by using three patch antennas 510, 520, and 530.

Figure 17A:
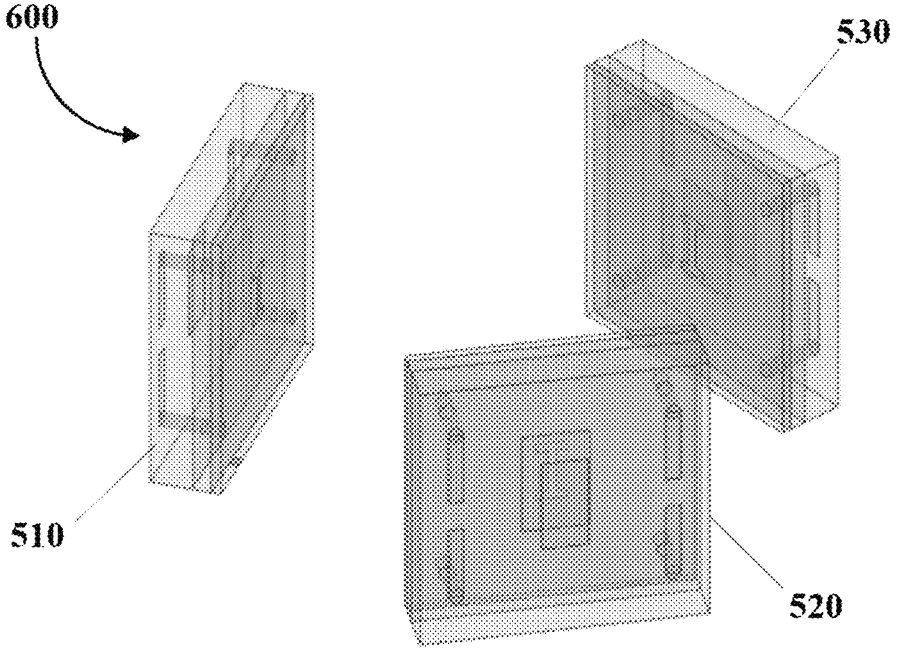
FIGS. 17*a* and 17*b* schematically illustrate a structure of an omnidirectional antenna array according to another exemplary embodiment of the present disclosure.
Figure 17B:
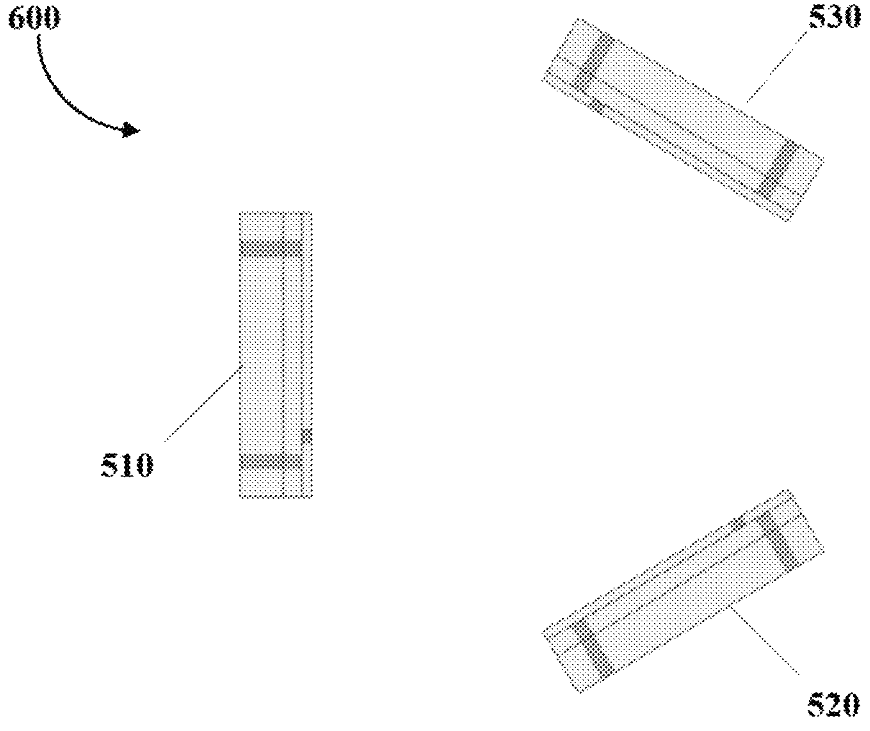

Referring to FIGS. 17*a* and 17*b*, a structure of an omnidirectional antenna array according to another exemplary embodiment of the present disclosure is schematically illustrated, wherein FIG. 17*a* illustrates the omnidirectional antenna array in the form of a perspective view and FIG. 17*b* illustrates the omnidirectional antenna array in the form of a plan view. As shown in FIGS. 17*a* and 17*b*, the omnidirectional antenna array 600 also includes three patch antennas 510, 520, and 530, each of which has the same structure as the patch antenna 100 shown in FIG. 1, which is not repeated here. The omnidirectional antenna array 600 differs from the omnidirectional antenna array 500 only in that there is a spacing between adjacent two of the three patch antennas 510, 520, and 530 in the omnidirectional antenna array 600. However, the three patch antennas 510, 520 and 530 in the omnidirectional antenna array 600 are arranged such that a distance between the centers of two adjacent patch antennas is less than ¼ of an operating wavelength of the patch antennas.

It should be understood that in other exemplary embodiments of the present disclosure, the omnidirectional antenna array may include more patch antennas, such as four, five or six patch antennas, and so on.

Figure 18:
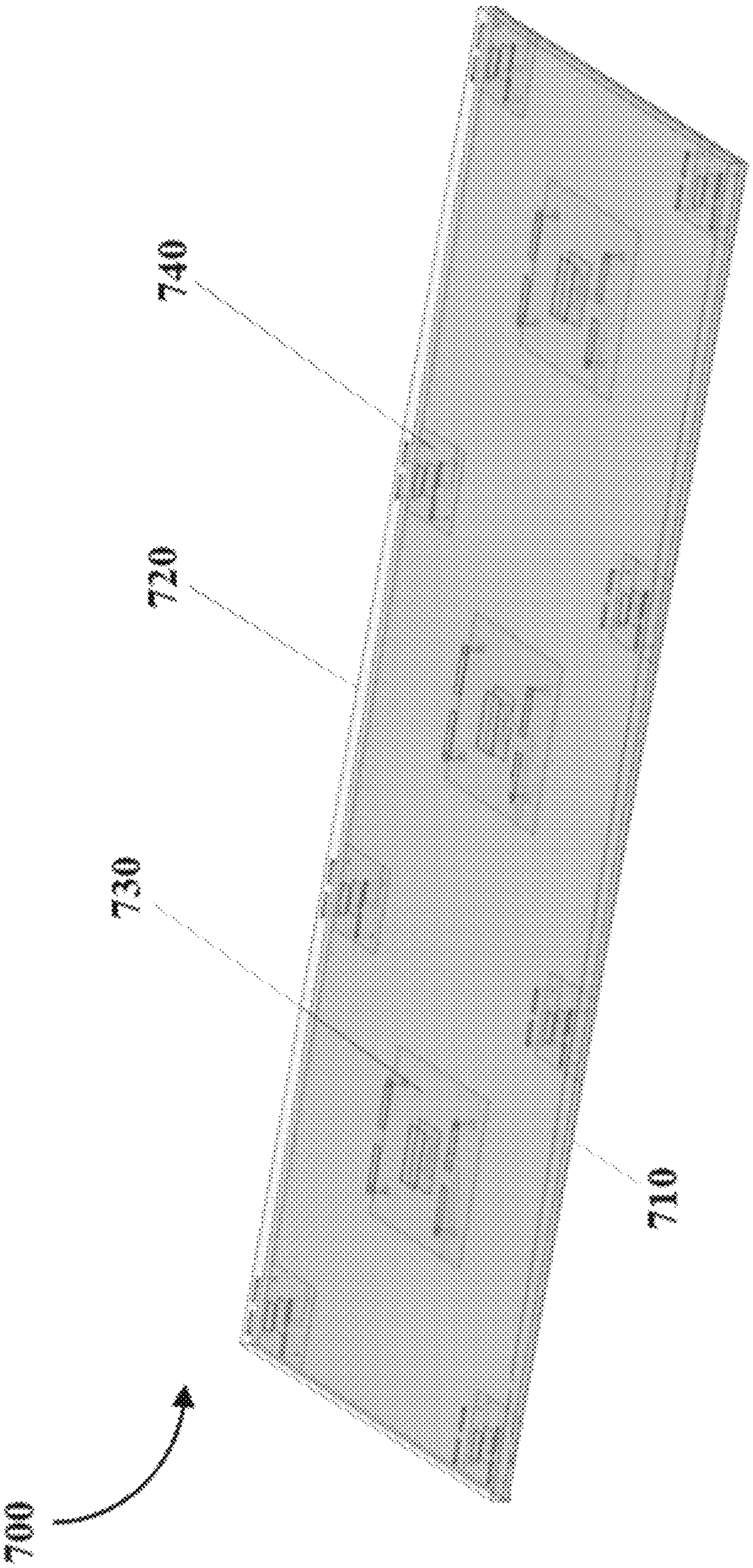
FIG. 18 schematically illustrates a structure of a coplanar radiating antenna array according to an exemplary embodiment of the present disclosure.

Referring to FIG. 18, a structure of a coplanar radiating antenna array according to an exemplary embodiment of the present disclosure is schematically illustrated. As shown in FIG. 18, a coplanar radiating antenna array 700 includes a first insulating medium substrate 710, a second insulating medium substrate 720, and a plurality of patch antenna modules 730, 740. An orthographic projection of the coplanar radiating antenna array 700 onto the first insulating medium substrate 710 has a rectangular shape, however it should be understood that any other shape is possible, such as square, parallelogram, trapezoid, and so on, and the present disclosure does not impose any limitation in this respect. The first insulating medium substrate 710 and the second insulating medium substrate 720 each include a bottom surface and a top surface, the first insulating medium substrate 710 and the second insulating medium substrate 720 are stacked such that the top surface of the first insulating medium substrate 710 abuts against the bottom surface of the second insulating medium substrate 720. The plurality of patch antenna modules may include a low-frequency patch antenna module 730 and a high-frequency patch antenna module 740. The low-frequency patch antenna module 730 and the high-frequency patch antenna module 740 have similar structures, and each may be implemented as the structure of the patch antenna 100 illustrated in FIG. 1. Specifically, each patch antenna module 730, 740 includes: a metal layer provided on the bottom surface of the first insulating medium substrate 710; a first radiating patch provided on a bottom surface of the second insulating medium substrate 720; and four vias. Each via passes through the first insulating medium substrate 710 and the second insulating medium substrate 720, a hole wall of each via is covered with a metal layer, and a first end of each via is electrically connected to the metal layer and a second end of each via is attached to a metal sheet. The four vias are arranged to surround and be spaced apart from the first radiating patch. Two vias are located at one side of the first radiating patch, and the other two vias are located at the opposite other side of the first radiating patch. A quadrangle formed by connecting first ends of the four vias in sequence surrounds an orthographic projection of the first radiating patch onto the bottom surface of the first insulating medium substrate 710. In some exemplary embodiments, a distance from the center of the first end of each via to the center of an orthographic projection of the first radiating patch onto the bottom surface of the first insulating medium substrate 710 ranges from ⅕ to ⅓ of an operating wavelength of the patch antenna. It can be seen that a plurality of patch antenna modules can be arranged on a same substrate in the coplanar radiating antenna array 700, some of which constitute high-frequency elements and the other of which constitute low-frequency elements, so that the coplanar radiating antenna array 700 can have at least two operating wavelengths, and also has a wider beam width (greater than 120 degrees) and a lower cross-sectional profile. FIG. 18 shows that the coplanar radiating antenna array 700 includes three low-frequency patch antenna modules 730 and eight high-frequency patch antenna modules 740, however this is merely exemplary and not restrictive. A coplanar radiating antenna array according to the present disclosure may include more or fewer low-frequency patch antenna modules and/or high-frequency patch antenna modules. The present disclosure does not impose any limitation on the number of low-frequency patch antenna modules and/or high-frequency patch antenna modules included in the coplanar radiating antenna array.

It should be understood that each of the plurality of patch antenna modules in the coplanar radiating antenna array 700 shown in FIG. 18 can be implemented as one of the patch antennas described with respect to various exemplary embodiments shown in FIGS. 1 to 5*b* and FIGS. 7 to 14 as well as other embodiments mentioned in the specification. For example, the vias included in each of the plurality of patch antenna modules in the coplanar radiating antenna array 700 may also be replaced with metal rods or strip-shaped metal structures in any other suitable form, the patch antenna module may include a plurality of strip-shaped metal structures, the strip-shaped metal structures are arranged such that at least two strip-shaped metal structures are located at a first side of the first radiating patch, and at least two strip-shaped metal structures are located at a second side of the first radiating patch, which is opposite to the first side, the metal sheets may also be replaced with metal traces printed onto the top surface of the second insulating medium substrate 720, and each patch antenna module may include only one radiating patch formed on the top surface or the bottom surface of the second insulating medium substrate 720, and the radiating patch may have the shape of a rectangle, a rectangle with rounded corners, a square, or the like. Furthermore, in some exemplary embodiments, the coplanar radiating antenna array 700 may further include a wiring layer, so as to provide electric power to the radiating patch in each patch antenna module through a feeding line arranged on the wiring layer, or at least one intermediate insulating medium substrate may be further provided between the first insulating medium substrate 710 and the second insulating medium substrate 720, so as to provide an intermediate radiating patch for at least one of the plurality of patch antenna modules to realize a multi-layer radiating patch arrangement. All of these implementations should be considered as the coplanar radiating antenna arrays falling within the scope of the present disclosure.

Terms used in the present disclosure are only used to describe embodiments in the present disclosure, and are not intended to limit the present disclosure. As used in the present disclosure, the singular forms "a," "an" and "the" are intended to include the plural forms as well, unless the context clearly indicates otherwise. It should be further understood that the terms "comprise", "include", "comprising" and "including", when used in the present disclosure, specify the presence of stated features, but do not preclude the presence or addition of one or more other features. As used in the present disclosure, the term "and/or" includes any and all combinations of one or more of the associated listed items. It should be understood that, although the terms "first", "second" and "third", etc. may be used in the present disclosure to describe various features, these features should not be limited by these terms. These terms are only used to distinguish one feature from another.

The azimuthal words used in the present disclosure, such as "bottom", "top", "upper", "lower", "horizontal", "vertical", and the like, are used to describe the display contents of the drawings of the present disclosure, and they do not impose any limitation on the present disclosure.

Unless otherwise defined, all terms (including technical terms and scientific terms) used in the present disclosure have the same meaning as commonly understood by one having ordinary skills in the art, to which the present disclosure belongs. It should be further understood that terms such as those defined in a common dictionary should be construed as having the same meaning as in the related art and/or in the context of the present specification, and will not be construed in an ideal or overly formal sense, unless defined explicitly as such in the present disclosure.

In the description of the Specification, expressions such as "one embodiment", "some embodiments", "an example", "a specific example", "some examples" or the like mean that a particular feature, structure, material or characteristic described in connection with the embodiment or example is included in at least an embodiment or example of the present disclosure. In this Specification, exemplary description of the above expressions is not necessarily directed to the same embodiment or example. Furthermore, the particular feature, structure, material, or characteristic as described may be combined in a suitable manner in any one or more embodiments or examples. Moreover, without contradicting each other and without violating the technical principles, different embodiments or examples and features of different embodiments or examples described in this Specification may be combined and assembled by a person skilled in the art, or some technical features may be omitted from different embodiments or examples described in this Specification, and embodiments or examples derived based on such combination, assembly or omission are still regarded as falling within the scope of the present disclosure.

Although the present disclosure has been described in detail in connection with some exemplary embodiments, it is not to be limited to the specific forms described in this disclosure. Rather, the scope of the present disclosure is defined only by the appended claims.

What is claimed is:

1. A patch antenna comprising:

a first insulating medium substrate comprising a first surface and an opposite second surface, a metal layer being provided on the first surface of the first insulating medium substrate;

a second insulating medium substrate comprising a first surface and an opposite second surface, a first radiating patch being provided on the first surface of the second insulating medium substrate, wherein the first insulating medium substrate and the second insulating medium substrate are stacked such that the second surface of the first insulating medium substrate abuts against the first surface of the second insulating medium substrate; and a plurality of strip-shaped metal structures located at both sides of the first radiating patch, each strip-shaped metal structure passing through the first insulating medium substrate and the second insulating medium substrate, a first end of each strip-shaped metal structure being electrically connected to the metal layer and a second end of each strip-shaped metal structure being attached to a metal sheet, the plurality of strip-shaped metal structures being arranged to surround the first radiating patch and be spaced apart from the first radiating patch, wherein at least two strip-shaped metal structures are located at a first side of the first radiating patch, and at least two strip-shaped metal structures are located at a second side of the first radiating patch, which is opposite to the first side, metal sheets attached to two strip-shaped metal structures that are farthest apart from each other among the at least two strip-shaped metal structures at the first side are bent toward each other, metal sheets attached to two strip-shaped metal structures that are farthest apart from each other among the at least two strip-shaped metal structures at the second side are bent toward each other as well, and a bent metal sheet forms an angle greater than or equal to 0 degrees and less than 90 degrees with the second surface of the second insulating medium substrate.

2. The patch antenna according to claim 1, wherein each strip-shaped metal structure is formed by a first via passing through the first insulating medium substrate and a second via passing through the second insulating medium substrate, the first via and the second via are aligned with each other, and hole walls of the first via and the second via are covered with a metal layer.

3. The patch antenna according to claim 1, wherein the plurality of strip-shaped metal structures comprise four strip-shaped metal structures, wherein two strip-shaped metal structures are located at the first side of the first radiating patch, and the other two strip-shaped metal structures are located at the second side, and a quadrangle formed by sequentially connecting first ends of the strip-shaped metal structures surrounds an orthographic projection of the first radiating patch onto the first surface of the first insulating medium substrate.

4. The patch antenna according to claim 3, wherein an orthographic projection of the patch antenna onto the first insulating medium substrate has a rectangular shape, and the four strip-shaped metal structures are respectively located at four corners of the patch antenna.

5. The patch antenna according to claim 3, wherein metal sheets attached to two strip-shaped metal structures located at a same side of the first radiating patch are bent toward each other.

6. The patch antenna according to claim 4, wherein the second end of the strip-shaped metal structure is flush with the second surface of the second insulating medium substrate, and the metal sheet is a metal trace printed onto the second surface of the second insulating medium substrate.

7. The patch antenna according to claim 6, wherein metal traces of two strip-shaped metal structures located at a same side of the first radiating patch are arranged as: deflecting, on the second surface of the second insulating medium substrate, towards the first radiating patch or away from the first radiating patch relative to a connecting line between second ends of the two strip-shaped metal structures, and wherein a deflecting angle of deflection ranges from greater than 0 degrees to less than or equal to 10 degrees.

8. The patch antenna according to claim 1, wherein the patch antenna further comprises a second radiating patch provided on the second surface of the second insulating medium substrate, an orthographic projection of the second radiating patch onto the first surface of the second insulating medium substrate is at least partially overlapped with the first radiating patch.

9. The patch antenna according to claim 1, wherein the patch antenna further comprises at least one intermediate insulating medium substrate provided between the first insulating medium substrate and the second insulating medium substrate, at least one intermediate radiating patch is provided on the intermediate insulating medium substrate, and an orthographic projection of the intermediate radiating patch onto the first surface of the second insulating medium substrate is at least partially overlapped with the first radiating patch.

10. The patch antenna according to claim 1, wherein the patch antenna further comprises a feeding line provided on the first surface of the second insulating medium substrate, the feeding line is electrically connected with the first radiating patch.

11. The patch antenna according to claim 1, wherein the patch antenna further comprises a coaxial cable line, the coaxial cable line passes through the first insulating medium substrate, and an outer conductor of the coaxial cable line is electrically connected with the metal layer on the first surface of the first insulating medium substrate, an inner conductor of the coaxial cable line is electrically connected with the first radiating patch.

12. The patch antenna according to claim 1, wherein the metal layer comprises a slit, an orthographic projection of the slit onto the first surface of the second insulating medium substrate falls within the first radiating patch, and wherein the patch antenna further comprises a wiring substrate comprising a first surface and an opposite second surface, the second surface of the wiring substrate abuts against the first surface of the first insulating medium substrate, a feeding line is provided on the first surface of the wiring substrate, and the feeding line is electrically connected with the metal layer.

13. The patch antenna according to claim 12, wherein a shape of the slit comprises an H-shape.

14. The patch antenna according to claim 1, wherein a polygon formed by sequentially connecting first ends of the strip-shaped metal structures surrounds an orthographic projection of the first radiating patch onto the first surface of the first insulating medium substrate.

15. The patch antenna according to claim 1, wherein a distance from a center of a first end of each strip-shaped metal structure to a center of an orthographic projection of the first radiating patch onto the first surface of the first insulating medium substrate is between ⅕ to ⅓ of an operating wavelength of the patch antenna.

16. An omnidirectional antenna array, comprising at least three patch antennas according to claim 1, wherein the at least three patch antennas are arranged such that axis lines each passing through a center of a patch antenna and extending along a normal direction of the first insulating medium substrate and the second insulating medium substrate intersect at a point.

17. A coplanar radiating antenna array comprising:

a first insulating medium substrate comprising a first surface and an opposite second surface;

a second insulating medium substrate comprising a first surface and an opposite second surface, wherein the first insulating medium substrate and the second insulating medium substrate are stacked such that the second surface of the first insulating medium substrate abuts against the first surface of the second insulating medium substrate; and a plurality of patch antenna modules, wherein each patch antenna module comprises:

a metal layer provided on the first surface of the first insulating medium substrate;

a first radiating patch provided on the first surface of the second insulating medium substrate; and a plurality of strip-shaped metal structures located at both sides of the first radiating patch, each strip-shaped metal structure passing through the first insulating medium substrate and the second insulating medium substrate, a first end of each strip-shaped metal structure being electrically connected with the metal layer and a second end thereof being attached to a metal sheet, the plurality of strip-shaped metal structures being arranged to surround the first radiating patch and be spaced apart from the first radiating patch, wherein at least two strip-shaped metal structures are located at a first side of the first radiating patch, and at least two strip-shaped metal structures are located at a second side of the first radiating patch, which is opposite to the first side, metal sheets attached to two strip-shaped metal structures that are farthest apart from each other among the at least two strip-shaped metal structures at the first side are bent toward each other, metal sheets attached to two strip-shaped metal structures that are farthest apart from each other among the at least two strip-shaped metal structures at the second side are bent toward each other as well, and a bent metal sheet forms an angle greater than or equal to 0 degrees and less than 90 degrees with the second surface of the second insulating medium substrate.

18. The coplanar radiating antenna array according to claim 17, wherein the plurality of patch antenna modules comprises a low-frequency patch antenna module and a high-frequency patch antenna module.

19. The coplanar radiating antenna array according to claim 17, wherein, in at least one patch antenna module of the plurality of patch antenna modules, each strip-shaped metal structure is formed by a first via passing through the first insulating medium substrate and a second via passing through the second insulating medium substrate, the first via and the second via are aligned with each other, and hole walls of the first via and the second via are covered with a metal layer.

20. The coplanar radiating antenna array according to claim 17, wherein at least one patch antenna module of the plurality of patch antenna modules further comprises a second radiating patch provided on the second surface of the second insulating medium substrate, an orthographic projection of the second radiating patch onto the first surface of the second insulating medium substrate falls within the first radiating patch.

* * * * *